(12) United States Patent
Zhang (10) Patent No.: US 9,970,365 B2
(45) Date of Patent: May 15, 2018

(54) ENGINE SYSTEM WITH ROTATABLE FLOW GUIDE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 15/065,233

(22) Filed: Mar. 9, 2016

(65) Prior Publication Data

US 2017/0260913 A1    Sep. 14, 2017

(51) Int. Cl.
*F02D 41/00* (2006.01)
*F02D 41/14* (2006.01)

(52) U.S. Cl.
CPC ..... *F02D 41/0002* (2013.01); *F02D 41/1454* (2013.01); *F02D 2041/0015* (2013.01); *F02D 2200/021* (2013.01); *F02D 2200/101* (2013.01)

(58) Field of Classification Search
CPC ............ F02D 41/0002; F02D 41/1454; F02D 2200/101; F02D 2200/021; F02D 2041/0015; F02D 2700/0207; F02D 9/103; F02D 9/1025; F02B 29/02; F02B 31/00; F02B 31/06; F02B 2275/48; F02B 2023/106; F02B 2023/108; F02B 31/04; F02B 27/0294; Y02T 10/146; Y02T 10/125; Y02T 10/42; F02M 35/1008

USPC ............... 123/681, 188.14, 308, 306
See application file for complete search history.

(56) References Cited

U.S. PATENT DOCUMENTS 5,165,374 A * 11/1992 Chapman ............... F02B 31/06
                                                                  123/308
5,829,408 A    11/1998 Yamaguchi et al.

FOREIGN PATENT DOCUMENTS

JP          60206931 A * 10/1985 .............. F02B 31/06
JP          61175231 A *  8/1986 .............. F02B 31/06

OTHER PUBLICATIONS

JP 60206931 A—English Translation.*
JP 61175231 A—English Translation.*

* cited by examiner

*Primary Examiner* — Joseph Dallo
*Assistant Examiner* — Scott A Reinbold
(74) *Attorney, Agent, or Firm* — Julia Voutyras; McCoy Russell LLP (57) ABSTRACT

An engine system provided. The engine system includes a rotatable flow guide including a flow altering surface positioned upstream of an intake valve having a first side with a curved contour, the flow altering surface generating tumble and swirl flow patterns of intake airflow entering a cylinder through the intake valve in a plurality of active positions. The engine system further includes a flow guide actuator rotating the flow altering surface to alter the tumble and swirl flow patterns of the intake airflow.

20 Claims, 7 Drawing Sheets

ENGINE SYSTEM WITH ROTATABLE FLOW GUIDE

BACKGROUND/SUMMARY

In cylinders of internal combustion engines, intake airflow patterns can affect combustion characteristics such as efficiency, ignition, and knock. Intake airflow affects both port as well as direct injection fuel systems. Tumble and swirl patterns are used to characterize different aspects of the turbulence in the cylinder. Specifically, tumble and swirl ratios can be used to quantify the magnitude of these flow patterns. Tumble ratio is defined as the strength of horizontal recirculation of the intake gas in the cylinder while swirl ratio is defined as the strength of vertical recirculation in the cylinder. Tumble and swirl patterns have different influences on various facets of combustion such as ignition, knock, efficiency, emissions, power, etc. In previous engine's intake ports are designed to provide fixed tumble and swirl patterns that improve combustion only for a specific operating condition. Therefore, when the engine is operated over a wide range of conditions, the set patterns of the combustion airflow can negatively impact combustion when the engine is run outside of the specified operating condition.

To address at least some of the aforementioned problems, an engine system is provided. The engine system includes a rotatable flow guide including a flow altering surface positioned upstream of an intake valve having a first side with a curved contour, the flow altering surface generating tumble and swirl flow patterns of intake airflow entering a cylinder through the intake valve in a plurality of active positions. The engine system further includes a flow guide actuator rotating the flow altering surface to alter the tumble and swirl flow patterns of the intake airflow. In this way, the flow altering surface changes the turbulence of air entering the cylinder to improve combustion efficiency, reduce knock, increase power, and/or decrease emissions, across a wide range of operating conditions. Thus, the flow altering surface can be rotated to provide turbulence in the cylinder that best suits the current operating conditions, if desired.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An engine system configured to dynamically adjust intake port and cylinder flow characteristics, such as tumble and swirl ratios of intake airflow is described herein. The engine system includes an adjustable flow guide having a flow altering surface positioned in an intake port of an engine. The flow altering surface can include a first side having a concave contour and a second side having a convex contour, similar to the shape of a spoon. The flow altering surface is rotated to adjust the turbulence of the intake airflow entering a cylinder based on engine operating conditions. Specifically, the angle at which the first and second sides are arranged can affect both the tumble and swirl generated in the cylinder. This is achieved by the curved contours of the flow altering surface directing a greater amount of airflow to selected portions of an intake valve head, to generate tumble and/or swirl flow. These flow patterns are caused by an imbalance in airflow rates around the intake valve. In this way, turbulence of air entering the cylinder can be adjusted based on changing conditions in the engine to improve combustion efficiency, reduce knock, increase power, and/or decrease emissions. The rotatable flow guide therefore enables turbulence in the cylinder to be altered to best suit the current operating conditions to improve combustion.

Figure 1:
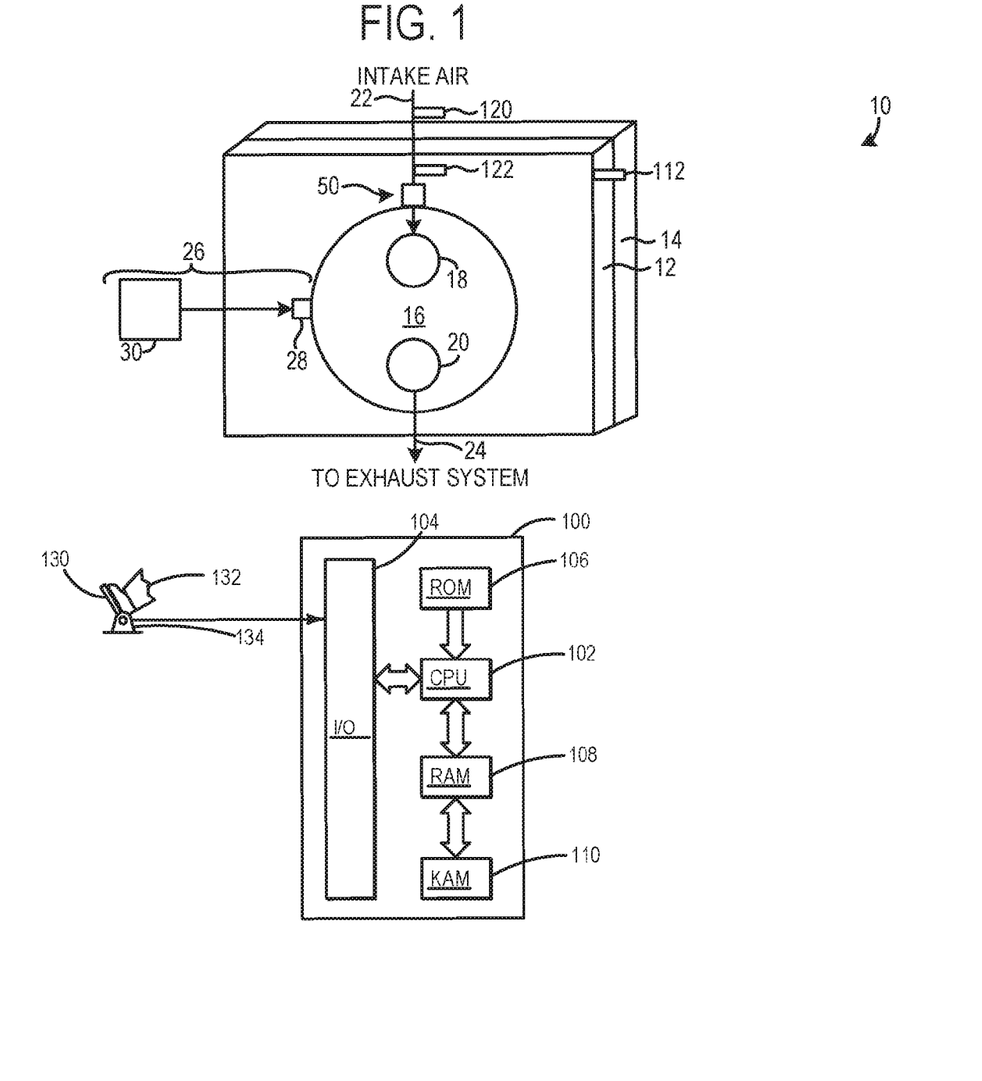
FIG. 1 shows an illustration of an engine.

FIG. 1 shows a schematic depiction of an engine 10 used to provide motive power to a vehicle, for example. In the depicted example, the engine 10 includes a cylinder head 12 coupled to a cylinder block 14 forming a cylinder 16. The engine 10 is configured to implement combustion operation in a cylinder 16. An intake valve 18 is provided in the engine 10 to flow intake air into the cylinder 16 at selected time intervals. Correspondingly, an exhaust valve 20 is provided in the engine 10 to flow exhaust gas out of the cylinder into a downstream exhaust system at selected time intervals.

Arrow 22 represents the flow of intake air from upstream intake system components such as intake conduits, an intake manifold, a throttle, a compressor, etc., to the intake valve 18. On the other hand, arrow 24 represents the flow of exhaust gas to downstream components such as exhaust conduits, an exhaust manifold, emission control device(s), a turbine, etc., from the exhaust valve 20.

A fuel delivery system 26 is also provided in the engine 10. The fuel delivery system 26 is configured to provide fuel for combustion in the cylinder 16 at desired time intervals. The fuel delivery system 26 includes a direct injector 28, in the illustrated example, and upstream components 30. The upstream components 30, such as fuel pumps, valves, conduits, etc., are configured to provide fuel to the fuel injector 28. However, a port injector configured to deliver fuel into a conduit upstream of the cylinder may be additionally or alternatively included in the fuel delivery system 26. The engine 10 is configured to implement a four stroke combustion cycle in the engine. The combustion strokes include an intake stoke, a compression stroke, a combustion stroke, and an exhaust stroke.

The engine 10 further includes an engine system 50 configured to adjust the turbulence in the intake air in the cylinder 16. Specifically, the engine system 50 is configured to adjust the tumble and swirl flow patterns of the intake airflow in the cylinder 16 based on engine operating conditions. Adjusting turbulence in the cylinder enables combustion to be improved over a wide range of engine operating conditions. In particular, combustion efficiency can be increased while emissions and knock are reduced when the tumble and swirl patterns in the cylinder are adjusted to suit engine operating conditions. The engine system 50 is described in greater detail herein with regard to FIGS. 2-10.

Controller 100 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 100 may receive various signals from sensors coupled to engine 10. For example, the controller 100 may receive measurement of inducted mass air flow (MAF) from a mass air flow sensor 120; engine coolant temperature (ECT) from temperature sensor 112; a profile ignition pickup signal (PIP) from a Hall effect sensor or other type coupled to a crankshaft; throttle position (TP) from a throttle position sensor 134 coupled to a pedal 130 actuated by an operator 134; and absolute manifold pressure signal, MAP, from sensor 122. Engine speed signal, RPM, may be generated by controller 100 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, an engine speed sensor may produce a predetermined number of equally spaced pulses every revolution of the crankshaft.

Controller 100 may be included in a control system configured to receive sensor signals from sensors in the engine and send commands to various actuators in the engine. Moreover, the controller 100 may be configured to implement the methods and other engine control techniques described herein. Specifically, the controller 100 may be configured to command a rotatable flow guide to rotate a flow altering surface in the guide into various configurations, described in greater detail herein.

Although the engine 10 is depicted as having only a single cylinder, in other examples, the engine 10 can include more than one cylinder with each cylinder having a corresponding engine system including a rotatable flow guide and flow guide actuator, similar to the rotatable flow guide and flow guide actuator, discussed in greater detail herein with regard to FIGS. 2-10. The controller 100 may be configured to independently adjust each of the flow guide actuators during certain operating conditions and during other operating conditions may be configured to synchronously adjust each of the flow guide actuators.

Figure 2:
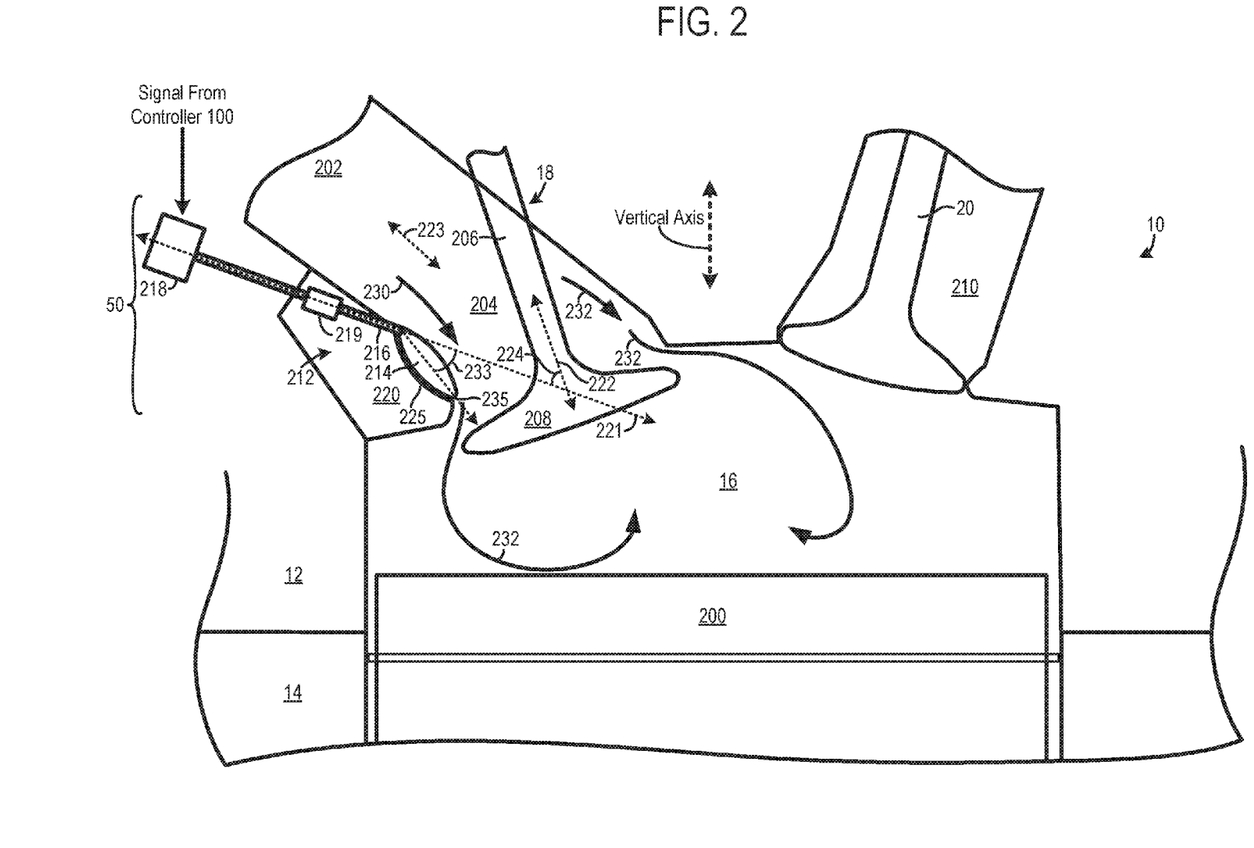
FIG. 2 shows an exemplary illustration of a portion of the engine depicted in FIG. 1 including an engine system having a rotatable flow guide with a surface upstream of a cylinder.

FIG. 2 illustrates an exemplary illustration of a portion of the engine 10 including engine system 50 as well as the cylinder block 14, the cylinder head 12, and the cylinder 16. A piston 200 is disposed in the cylinder 16. It will be appreciated that the piston 200 may be rotationally coupled to a crankshaft.

The engine 10 includes an intake passage 202 and an intake port 204 positioned downstream of an intake passage 202. It will be appreciated that the intake passage 202 receives intake air from upstream components such as an air intake, air filter, throttle, compressor, manifold, etc.

The intake valve 18 extends through the intake port 204. The intake valve 18 is in an open position in FIG. 2, where intake air flows into the cylinder 16 from the intake port 204. Thus, FIG. 2 illustrates an intake stroke in a combustion cycle. However, when the intake valve 18 is in a closed position the valve seats and seals on a section of the intake port 204 to prevent airflow from entering the cylinder 16. Specifically, the intake valve 18 includes a stem 206 and a head 208 configured to seat and seal with a portion of the cylinder head 12 in a closed configuration.

An exhaust passage 210 and the exhaust valve 20 are also included in the section of the engine 10 shown in FIG. 2. The exhaust valve 20 is in a closed position where the exhaust valve 20 is seated and sealed on a portion of the cylinder head 12. However, during the exhaust stroke the exhaust valve 20 can be opened.

The intake valve 18 and the exhaust valve 20 may be actuated via a camshaft or electronic actuators. FIG. 2 illustrates the engine during an intake stroke in the combustion cycle. It will be appreciated that the engine 10 is also configured to perform compression, ignition, and exhaust strokes subsequent to the intake stroke.

The engine system 50 includes a rotatable flow guide 212 including a flow altering surface 214 extending (e.g., sloping away) from a shaft 216 coupled to a flow guide actuator 218. As shown, the shaft 216 extends through a wall 220 (e.g., lower wall) of the intake port 204 in the cylinder head 12. The flow guide actuator 218 is configured to rotate the shaft 216 and therefore the flow altering surface 214 about a rotational axis 221. In the depicted example, the flow altering surface 214 is positioned below a centerline 223 of the intake passage 202 in the inactive configuration shown in FIG. 2 as well as the active configurations shown in FIGS. 8-10. A vertical axis is provided for reference.

Specifically, the flow guide actuator 218 is configured to rotate the flow altering surface 214 to adjust an amount of flow impingement of intake airflow on different sides of the flow altering surface 214. Thus, rotational movement of the flow altering surface changes the relationship of the first and second sides with the intake airflow to generate tumble and swirl patterns based on engine operating conditions to improve combustion operation. The operating conditions may include one or more of engine power, load, air/fuel ratio, temperature, engine speed, and exhaust gas composition, in one example. It will be appreciated that the controller 100, shown in FIG. 1, may be configured to command the flow guide actuator 218 to rotate the flow altering surface 214 based on the aforementioned operating conditions. Additionally, a bearing 219 may also be provided in the engine system 50 to enable smooth rotation of the shaft 216.

In the configuration illustrated in FIG. 2, the flow altering surface 214 is in an inactive position where the flow altering surface is adjacent to the wall 220 of the intake port 204. Specifically in the depicted example, a section 225 (e.g., recessed section) of the wall 220 is contoured such that the flow altering surface 214 mates with the wall 220 in the inactive position. In this way, intake air can flow past the flow altering surface 214 without being drastically affected by the flow altering surface. However, it will be appreciated that the flow altering surface 214 may be rotated to extend into the intake port 204 such that a desired amount of tumble and swirl are generated in the cylinder 16. The amount of rotation of the flow altering surface 214 dictates the amount of tumble and swirl generated by the flow altering surface. For instance, a 180 degree rotation of flow altering surface 214 may increase the tumble generated in the cylinder 16 while a 270 or 90 degree rotation may increase the swirl generated in the cylinder 16. Specifically, flow altering surface rotational angle ranges between 60 to 120 degrees and 240 to 300 clockwise may generate more swirl than tumble. Additionally, flow altering surface rotational angle ranges between 150 to 210 degrees and 330 to 30 degrees clockwise may generate more tumble than swirl and flow altering surface rotational angle ranges between 30 to 60 degrees, 120 to 150 degree, 210 to 240 degrees and 300 to 330 degree may generate a substantially equal amount of swirl and tumble. A 0 degree arrangement of the flow altering surface may be the position of the flow altering surface in the inactive position depicted in FIG. 2. The contours of the flow altering surface 214 enable desired swirl and tumble airflow patterns to be generated. Specifically in one example, the contours of the flow altering surface 214 enable independent generation of swirl and tumble in the cylinder. The flow altering surface 214 geometry is discussed in greater detail with regard to FIGS. 3-4.

The flow guide actuator 218 is configured to receive a signal from the controller 100, shown in FIG. 1, to command the flow guide actuator 218 to rotate the flow altering surface 214. An electric motor may be used to provide the rotational functionality in the flow guide actuator 218. However, other rotational devices have been contemplated.

As shown, the rotational axis 221 of the rotatable flow guide 212 intersects the central axis 222 of the intake valve 18 at a non-straight angle 224. Specifically, the angle 224 may be larger than the angle between valve stem and intake port and in the range between 45 to 60 degrees. The arrangement of the flow guide at this angle enables the swirl and tumble of the cylinder airflow to be adjusted in a desired manner. However, other relative positions of the rotatable flow guide and intake valve may be used in other examples.

Arrow 230 depicts the general direction of intake airflow past the flow altering surface 214. It will be appreciated that the flow altering surface is in the inactive position. Therefore, the flow altering surface doesn't have a large affect on the intake airflow. Arrows 232 show the general direction of intake airflow past the intake valve 18 and in the cylinder 16. It will be appreciated that the differences between airflow rates around different sections of the intake valve head 208 may not vary by a large amount. Thus, when the airflow rates are not highly divergent, only a small amount of tumble and swirl may be generated.

The flow altering surface 214 extends away from the shaft 216 at an angle 233. The angle 233 measures the separation between the rotational axis 221 intersecting a line 235 extending through a longitudinal tip of the flow altering surface 214 and the intersection between the shaft 216 and the flow altering surface 214. In some examples, the angle 233 may be less than 35, 30, or 15 degrees. In additional examples, the angle 233 may be greater than 5, 10, or 15 degrees.

The flow altering surface 214 is radially offset from the rotational axis 221, in the depicted example. Thus, during rotation of the rotatable flow guide 212 the flow altering surface 214 essentially orbits about the rotational axis 221. This enables the flow altering surface 214 to mate with the section 225 in an inactive configuration and extend into the intake port 204 by a desired amount in an active configuration. Thus, the flow altering surface 214 can extend away from the section 225 (e.g., recessed section) when it is desired to increase turbulence in the airflow entering the cylinder and be rotated into an inactive (e.g., deactivated) configuration where the flow altering surface 214 mates with section 225 of the lower wall 220 and does not have a significant effect on turbulence generation in the intake airflow.

Figure 3:
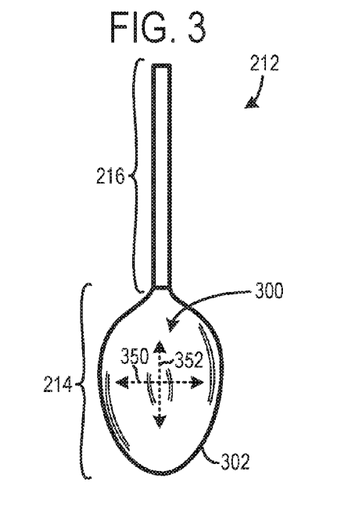
FIGS. 3, 4 and 5 show exemplary detailed illustrations of different sides of the rotatable flow guide included in the engine system shown in FIG. 2.
Figure 4:
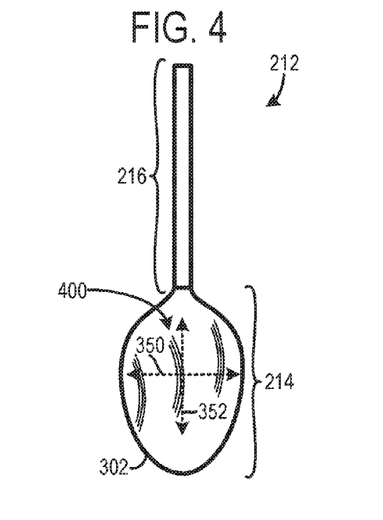

FIGS. 3 and 4 shows the rotatable flow guide 212 including the flow altering surface 214 and the shaft 216 coupled to the flow guide actuator 218, shown in FIG. 2. Specifically, FIG. 3 shows a first side 300 of the flow altering surface 214 and FIG. 4 shows a second side 400 of the flow altering surface 214. The first and second sides (300 and 400) each have a curved contour. In the depicted example, the first side 300 has a concave contour and the second side 400 has a convex contour. Thus, the first and second sides have opposing contours. The shape of the flow altering surface 214 is similar to a "spoon" in the examples illustrated herein, wherein the end is formed like a spoon with inner and outer spoon-shaped surfaces, and the spoon has a step formed like a spoon's handle that is rotated by an actuator about a central axis of the spoon's handle. However, other flow altering surface geometries have been contemplated. The curvature of the first and second sides of the flow altering surface enable a desired amount of swirl and tumble airflow to be generated in the intake airflow entering the cylinder.

Additionally, a peripheral edge 302 of the flow altering surface 214 has a curved contour in the illustrated example. However, other peripheral edge contours have been contemplated. The curved contour of the peripheral edges enables wakes to be generated behind the flow altering surface to provide turbulence in the intake airflow to improve combustion operation.

Additionally, the first side 300 and the second side 400 of the flow altering surface 216 are curved along a lateral axis 350 and a longitudinal axis 352. Moreover, the flow altering surface 216 is symmetric about the longitudinal axis 352 in the depicted example. The curvatures about these two axis enables a desired amount of tumble and swirl flow patterns to be generated when the surface is in an active position. However, other contours of the flow altering surface may be used in other examples. For instance, the flow altering surface may only be curve about a single axis.

Figure 5:
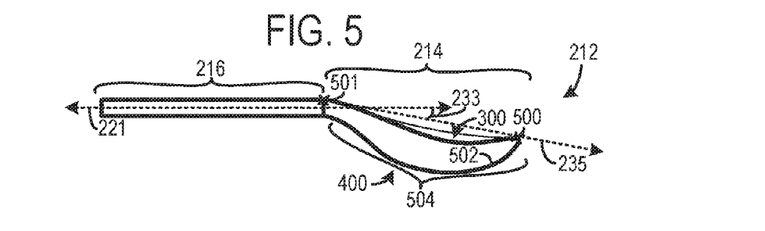

FIG. 5 shows a side view of the rotatable flow guide 212 including the shaft 216 and the flow altering surface 214. In this view, both the first side 300 and the second side 400 of the flow altering surface 214 are illustrated. The angle 233 is also illustrated in FIG. 5. As previously discussed, the angle 233 measures the separation between the rotational axis 221 and the line 235 extending through the longitudinal tip 500 of the flow altering surface 214 and the intersection 501 between the shaft 216 and the flow altering surface 214. The angle 233 may be a non-straight angle less than 35, 30, or 15 degrees and/or greater than 5, 10, or 15 degrees. Angles in these ranges enable the flow altering surface 214 to travel in a path that "orbits" around the rotational axis 221. The rotational path of the flow altering surface 214 enables the flow altering surface 214 to receive impinging intake flow in active positions and be aligned with a periphery of the intake port 204 in the inactive position where the surface has limited influence on the intake flow. Additionally, the convex section 502 of the flow altering surface 214 does not cross the rotational axis 221, in the depicted example. However, other surface geometries have been contemplated. For instance, the flow altering surface may include a first section that is parallel to the rotational axis and a second section that extend at an angle away from the rotational axis. Additionally, a section 504 of the flow altering surface 214 is radially offset from the shaft 216.

Figure 6:
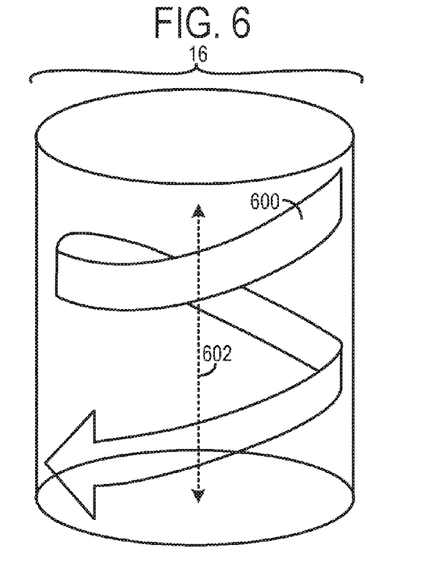
FIGS. 6 and 7 show depictions of exemplary swirl and tumble flow patterns in the cylinder shown in FIG. 2.
Figure 7:
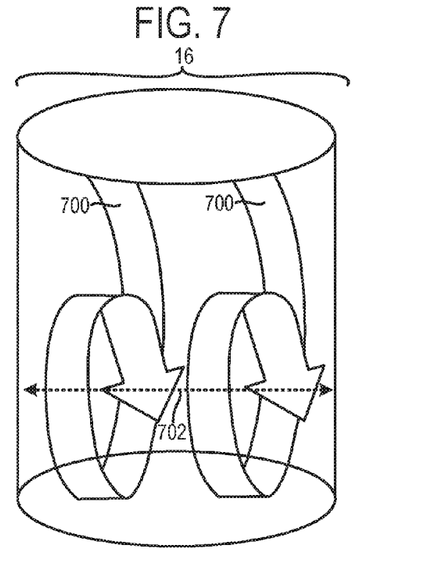

FIGS. 6 and 7 show the cylinder 16 with exemplary swirl and tumble flow patterns, providing visual references of the flow patterns. However, it will be appreciated that the actual airflow patterns generated in the cylinder may have greater complexity than the patterns depicted in FIGS. 6 and 7. For instance, the airflow in the cylinder may exhibit both swirl and tumble characteristics. Thus, the patterns depicted in FIGS. 6 and 7 illustrate modeled swirl and tumble flow patterns for reference.

Specifically, FIG. 6 shows an example depiction of the cylinder 16 with a swirl type airflow pattern. Arrow 600 depicts the general direction of airflow in the cylinder 16. A swirl ratio defined as the strength of vertical recirculation can be used to quantify this type of airflow pattern. A vertical axis 602 around which the air circulates is provided for reference. The swirl direction in FIG. 6 is in a clockwise direction. However, in other examples the swirl direction may be in a counter-clockwise direction. It may be desirable to generate swirl in the cylinder 16 during engine cold start and idle conditions to reduce (e.g., prevent) fuel spray impingement on cylinder wall.

Figure 8:
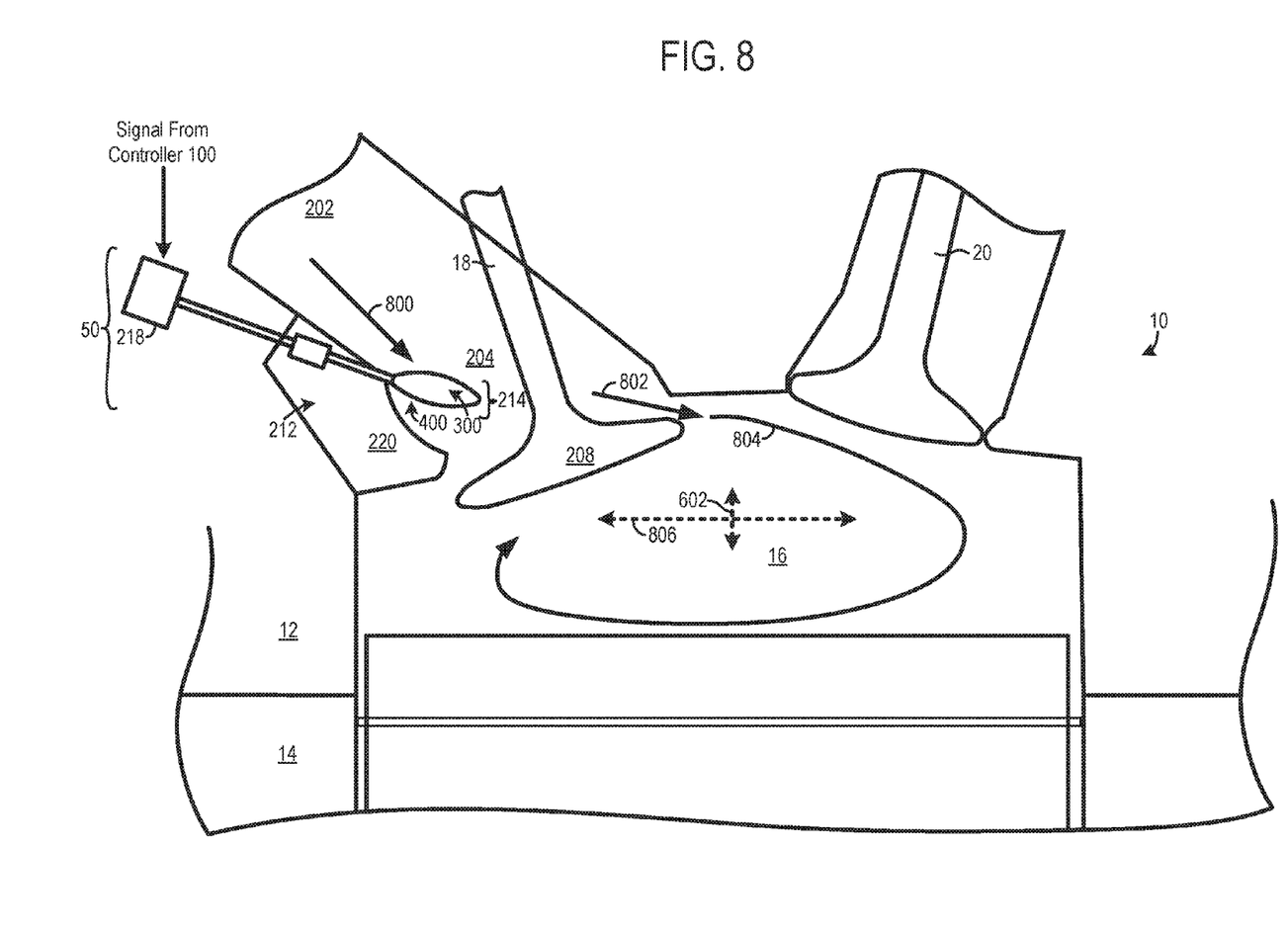
FIG. 8 shows the surface in the engine system depicted in FIG. 2 in another position that generates increased tumble in the cylinder.
Figure 9:
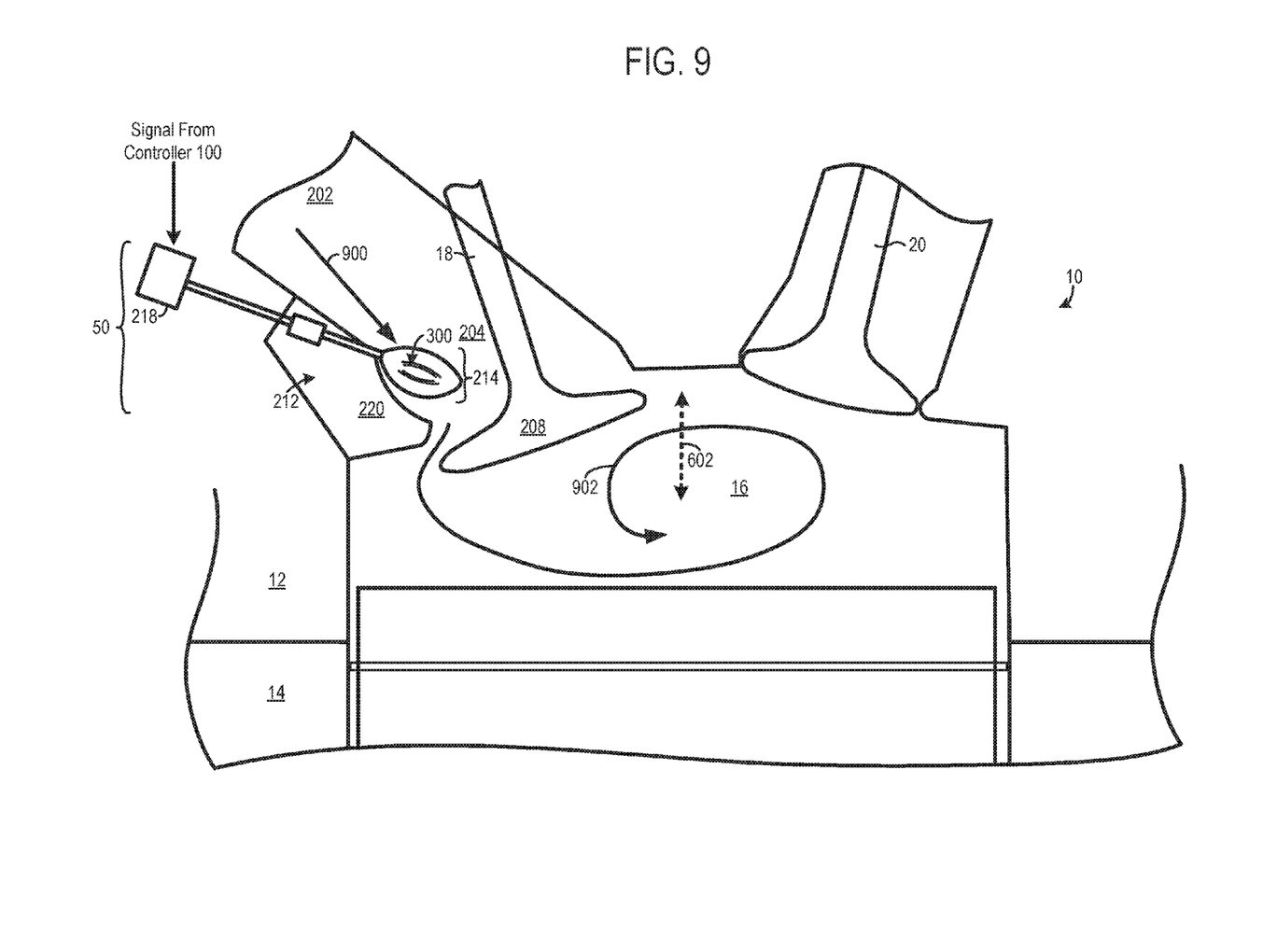
FIGS. 9 and 10 show the flow altering surface in the engine system depicted in FIG. 2 in two positions that generates increased swirl in the cylinder.
Figure 10:
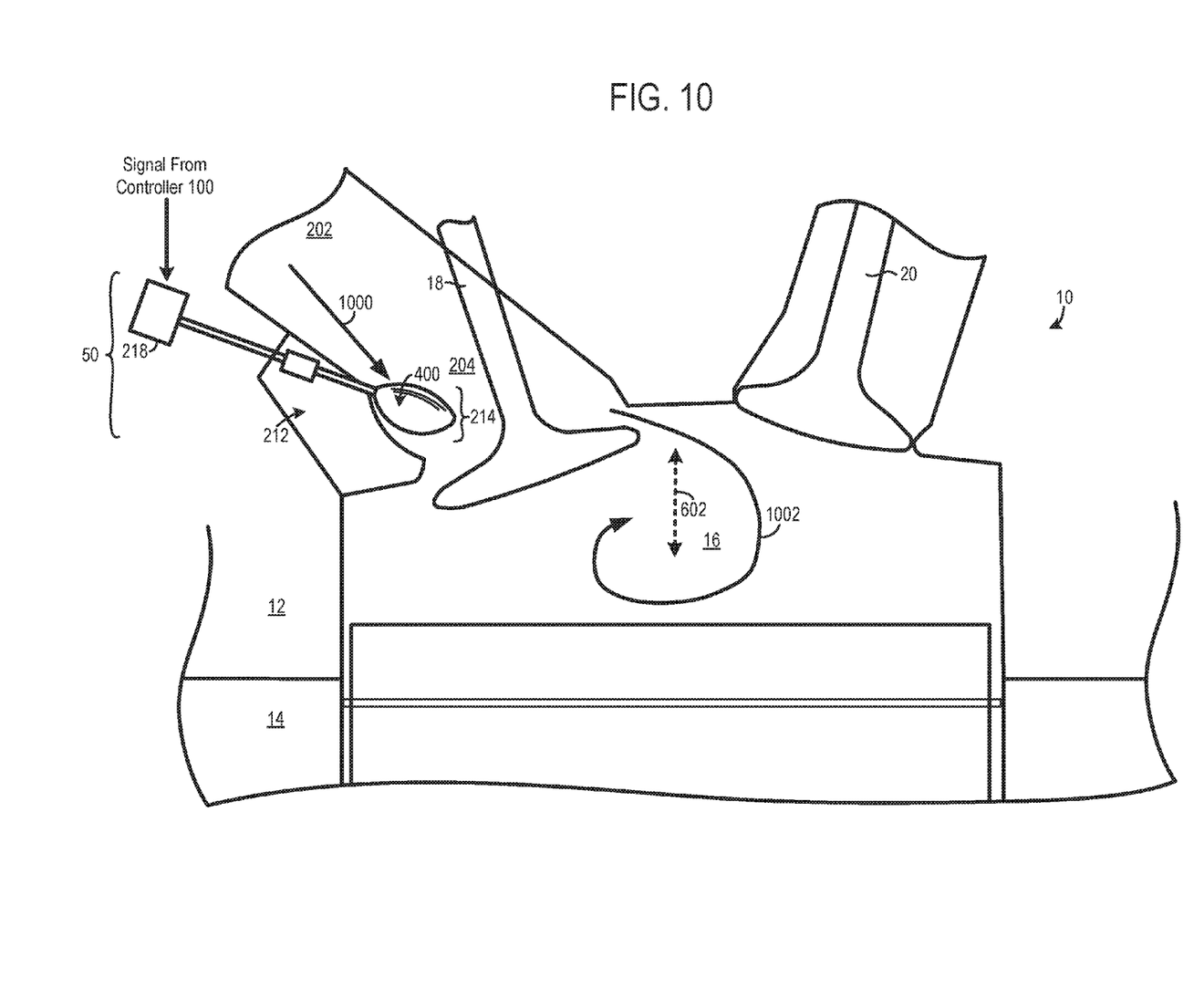

FIG. 7 shows an illustration of the cylinder 16 with a tumble type airflow pattern. Arrows 700 depicts the general direction of airflow in the cylinder 16. A tumble ratio, defined as the strength of horizontal recirculation, can be used to quantify this type of airflow pattern. A horizontal axis 702 around which the air circulates is provided for reference. It may be desirable to generate tumble in the cylinder 16 during engine operates at high (e.g., peak) power and high load condition. At engine light to mid load conditions, both swirling and tumble flow is desired for improved (e.g., optimum) air/fuel motion in the cylinder. FIGS. 8-10 illustrated the flow altering surface 214 in the engine system 50 in different active positions configured to generate increased swirl and/or tumble when compared to the inactive flow altering surface position shown in FIG. 2. The flow altering surface positions in FIGS. 8-10 are rotated away from the inactive position depicted in FIG. 2. The cylinder head 12 and cylinder block 14 forming the cylinder 16 are illustrated in FIGS. 8-10.

In particular, FIG. 8 shows the flow altering surface 214 of the rotatable flow guide 212 in the engine system 50 rotated into a configuration conducive to generating tumble in the cylinder airflow. Specifically, the flow altering surface 214 is rotated 180 degrees away from the flow altering surface position depicted in FIG. 2 via the flow guide actuator 218. As discussed above, the flow guide actuator 218 may be commanded by the controller 100, shown in FIG. 1, to move the flow altering surface 214 into the position shown in FIG. 8.

The first side 300 of the flow altering surface 214 faces the center of the intake port 204 in the position shown in FIG. 8. On the other hand, the second side 400 of the flow altering surface 214 faces the lower wall 220 of the intake port 204 in the flow altering surface position shown in FIG. 8.

Arrow 800 depicts the general airflow upstream of the flow altering surface 214. Arrow 802 depicts an airflow increase near a section of the intake valve 18 adjacent to the central axis 602 (i.e., vertical axis) of the cylinder 16. As such this flowrate imbalance around the intake valve 18 generated tumble in the cylinder 16. Arrow 804 depicts the tumble pattern of the cylinder airflow. As shown, arrow 804 rotates about a horizontal cylinder axis 806. It will be appreciated that the flow altering surface position shown in FIG. 8 directs a greater amount of airflow towards an inner side of the head 208 of the intake valve 18 to initiate tumble in the cylinder during an intake stroke. The exhaust valve 20 is also shown in FIG. 8.

FIG. 9 shows the flow altering surface 214 of the rotatable flow guide 212 in the engine system 50 of the engine 10. In FIG. 9 the flow altering pate 214 is rotated into a configuration conducive to generating swirl in the cylinder 16. Specifically, the flow altering surface 214 is rotated 270 degrees in a counterclockwise direction away from the flow altering surface position depicted in FIG. 2. As discussed above, the flow guide actuator 218 may be commanded by the controller 100, shown in FIG. 1, to rotate the flow altering surface 214 into the position shown in FIG. 9.

Arrow 900 depicts the general direction airflow upstream of the flow altering surface 214 in the intake passage 202. Arrow 902 depicts the general direction of airflow downstream of the flow altering surface 214 around the intake valve 18 and in the cylinder 16. It will be appreciated that the airflow impingement on the first side 300 of the flow altering surface 214 having a concave contour increases the amount of airflow directed to a section of the intake valve 18 adjacent to the lower wall 220. Consequently, the flow imbalance around the head 208 of the intake valve 18 generates a counterclockwise swirl flow pattern where airflow circulates around the central axis 602 (i.e., vertical axis) of the cylinder 16. Additionally, the exhaust valve 20, cylinder head 12, and the cylinder block 14 are also shown in FIG. 9.

FIG. 10 shows the flow altering surface 214 of the rotatable flow guide 212 rotated into another position conducive to generating swirl in the cylinder 16. Specifically, the flow altering surface 214 is rotated 180 degrees in a counterclockwise or clockwise direction from the flow altering surface position depicted in FIG. 9. As discussed above, the flow guide actuator 218 may be commanded by the controller 100, shown in FIG. 1, to rotate the flow altering surface 214 into the position shown in FIG. 10.

Arrow 1000 depicts the general airflow upstream of the flow altering surface 214 and arrow 1002 depicts the general airflow downstream of the flow altering surface 214. It will be appreciated that the airflow impingement on the second side 400 of the flow altering surface 214 having a convex contour increases the amount of airflow directed to a section of the intake valve 18 adjacent to the central axis 602 of the cylinder 16. The swirl pattern generated in FIG. 10 is in a clockwise direction. Additionally, the engine 10, engine system 50, exhaust valve 20, cylinder head 12, and the cylinder block 14 are also shown in FIG. 10.

Figure 11:
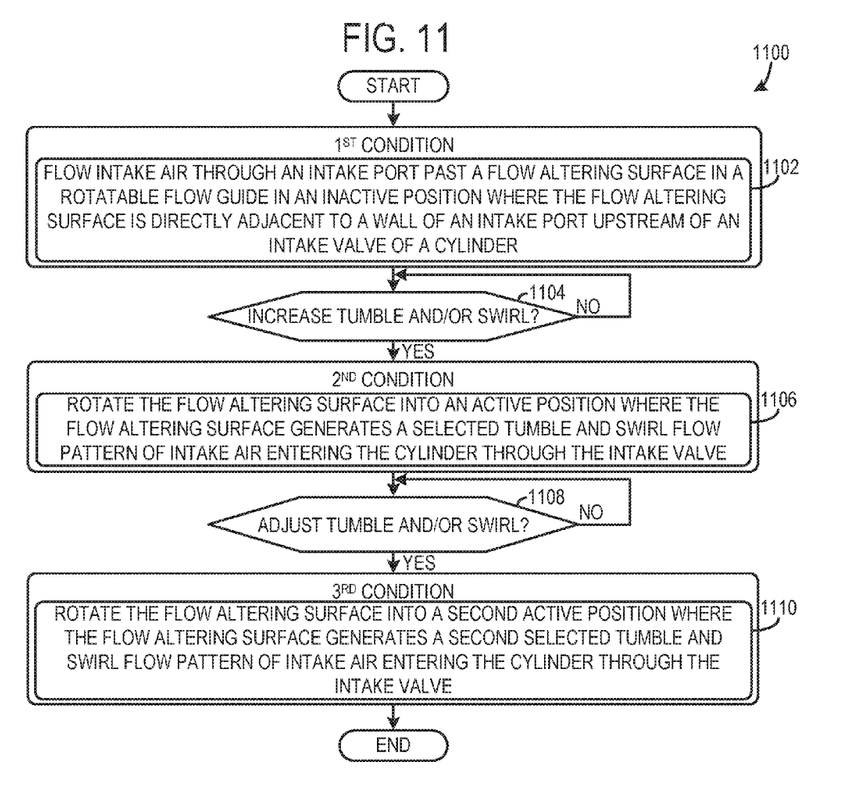
FIG. 11 shows a method for operation of an engine system.

FIG. 11 shows a method 1100 for operation of an engine system. The engine system discussed above with regard to FIGS. 1-10 may be used to implement the method 1100, in one example. However in other examples, other suitable engine systems may be used to implement the method 1100.

At 1102 the method includes, during a first operating condition, flowing intake air through an intake port past a flow altering surface in a rotatable flow guide in an inactive position where the flow altering surface is directly adjacent to a wall of an intake port upstream of an intake valve of a cylinder. Thus, in the inactive position the flow altering surface does not significantly change the flow pattern of intake air. Specifically, in the inactive position the intake air may not impinge a section (e.g., one side) of the flow altering surface. It will be appreciated that the flow altering surface may include a first side having a concave contour and a second side having a convex contour. Thus, the flow altering surface can be "spoon" shaped. In such an example, the convex side of the flow altering surface may be facing the center of the intake port.

Next at 1104 the method determines if it is desirable to increase tumble and/or swirl of the airflow in the cylinder. If it is determined that it is not desirable to increase the tumble and/or swirl of the airflow in the cylinder (NO at 1104) the method returns to 1104. However, if it is determined that it is desirable to increase the tumble and/or swirl of the airflow in the cylinder (YES at 1104) the method advances to 1106.

At 1106 the method includes, during a second operating condition, rotating the flow altering surface into an active position where the flow altering surface generates a selected tumble and swirl flow pattern of intake air entering the cylinder through the intake valve. In one example, the active position may be any angle greater than a 3, 5, or 10 degrees in a clockwise or counterclockwise rotational direction away from the inactive position. For instance, the flow altering surface may be rotated by 180 degrees or 270 degrees in a clockwise or counterclockwise direction to increase tumble or swirl.

Next at 1108 the method includes determining if it is desirable to adjust the tumble and/or swirl of the airflow in the cylinder. If it is determined that it is not desirable to adjust the tumble and/or swirl of the airflow in the cylinder (NO at 1108) the method returns to 1108. However, if it is determined that it is desirable to adjust the tumble and/or swirl of the airflow in the cylinder (YES at 1108) the method advances to 1110. At 1110 the method includes, during a third operating condition, rotating the flow altering surface into a second active position where the flow altering surface generates a second selected tumble and swirl flow pattern of intake air entering the cylinder through the intake valve. In one example, during the third operating condition a swirl ratio of the intake airflow may be increased and a tumble ratio of the intake airflow may be decreased. However, in other examples the swirl ratio may be decreased and the tumble ratio may be increased. In this way, different aspects of the cylinder airflow can be adjusted based on engine operating conditions to improve combustion operation.

Further in one example, the first operating condition is when engine speed is below a threshold value and the second operating conditions is when engine speed is greater than a threshold value. Still further in some examples, the tumble ratio of the airflow in the cylinder may be increased when engine operates at or near its full load or peak power conditions. Additionally in some examples, the swirl ratio of the airflow in the cylinder may be increased when the engine is operating under cold start or idle conditions. In yet another example, the tumble ratio may be increased and the swirl ratio of the airflow in the cylinder may be decreased when the engine operates at it high load condition. Conversely, tumble ratio may be decreased and the swirl ratio of the airflow in the cylinder may be increased when the engine operates under an idle condition. Therefore in one example, the tumble and swirl ratio may be adjusted based on one or more of engine power, load, air/fuel ratio, temperature, engine speed, and exhaust gas composition.

The subject matter of the present disclosure is further described in the following paragraphs. According to one aspect, an engine system is provided. The engine system includes a rotatable flow guide including a flow altering surface positioned upstream of an intake valve having a first side with a curved contour, the flow altering surface generating tumble and swirl flow patterns of intake airflow entering a cylinder through the intake valve in a plurality of active positions and a flow guide actuator rotating the flow altering surface to alter the tumble and swirl flow patterns of the intake airflow.

According to another aspect, an engine system is provided. The engine system includes a rotatable flow guide including a flow altering surface positioned upstream of an intake valve having a first side with a concave contour and a second side with a convex contour, the flow altering surface generating tumble and swirl flow patterns in the intake airflow entering a cylinder through the intake valve in a plurality of active positions and a flow guide actuator rotating the flow altering surface to alter the tumble and swirl flow patterns of the intake airflow.

According to another aspect, a method for operating an engine system is provided. The method includes during a first operating condition, flowing intake air through an intake port past a flow altering surface in a rotatable flow guide in an inactive position where the flow altering surface is directly adjacent to a wall of an intake port upstream of an intake valve of a cylinder and during a second operating condition, rotating the flow altering surface into an active position where the flow altering surface generates a selected tumble and swirl flow pattern of intake air entering the cylinder through the intake valve.

In any of the aspects described herein or combinations of the aspects, the engine system may further include a controller configured to command the flow guide actuator to rotate the flow altering surface into an inactive position and a plurality of active positions based on engine operating conditions.

In any of the aspects described herein or in any combination of the aspects, the flow altering surface may include a second side with a curved contour, the flow altering surface being spoon-shaped with an opposite surface also spoon-shaped so that a spoon shape is formed overall, the actuator rotating the spoon shape about an axis of the spoon's handle.

In any of the aspects described herein or in any combination of the aspects, the first and second side of the flow altering surface may have opposing contours.

In any of the aspects described herein or in any combination of the aspects, rotational movement of the flow altering surface may change the relationship of the first and second sides with the intake airflow to generate desired tumble and swirl patterns.

In any of the aspects described herein or in any combination of the aspects, the first side may have a concave contour and the second side has a convex contour.

In any of the aspects described herein or in any combination of the aspects, the engine system may further include a controller configured to command the flow guide actuator to rotate the flow altering surface into an inactive position and a plurality of active positions based on engine operating conditions. In this aspect, the engine operating conditions may include one or more of engine power, load, air/fuel ratio, temperature, engine speed, and exhaust gas composition.

In any of the aspects described herein or in any combination of the aspects, the rotatable flow guide may include a shaft directly attached to the flow altering surface and the flow guide actuator.

In any of the aspects described herein or in any combination of the aspects, an angle formed between a rotational axis of the shaft and a line extending through a longitudinal tip of the flow altering surface and an intersection between the shaft and the flow altering surface may be greater than 5 degrees.

In any of the aspects described herein or in any combination of the aspects, a section of the flow altering surface may be radially offset from a rotational axis of the shaft.

In any of the aspects described herein or in any combination of the aspects, the shaft may extend through a lower wall of an intake port in a cylinder head.

In any of the aspects described herein or in any combination of the aspects, a rotational axis of the flow altering surface may intersect a central axis of the intake valve at a non-straight angle.

In any of the aspects described herein or in any combination of the aspects, where tumble ratios and/or swirl ratios of the intake airflow when the flow altering surface is in the plurality of active positions may each be greater than a tumble ratio and/or swirl ratio of the intake airflow when the flow altering surface is in the inactive position.

In any of the aspects described herein or in any combination of the aspects, a rotational axis of the flow altering surface may intersect a central axis of the intake valve at a non-straight angle.

In any of the aspects described herein or in any combination of the aspects, the method may further include during a third operating condition, rotating the flow altering surface into a second active position where the flow altering surface generates a second selected tumble and swirl flow pattern of intake air entering the cylinder through the intake valve.

In any of the aspects described herein or in any combination of the aspects, where during the third operating condition a swirl ratio of the intake airflow is increased and a tumble ratio of the intake airflow is decreased.

In any of the aspects described herein or in any combination of the aspects, the first operating condition may be when engine speed is below a threshold value and the second operating conditions may be when engine speed is greater than the threshold value.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An engine system comprising:
a rotatable flow guide extending away from a shaft into an intake port and including a flow altering surface positioned upstream of an intake valve, the rotatable flow guide having a first side with a curved contour, the flow altering surface generating tumble and swirl flow patterns of intake airflow entering a cylinder through the intake valve in a plurality of active positions; and
a flow guide actuator rotating the flow altering surface to alter the tumble and swirl flow patterns of the intake airflow;
where the shaft has a rotational axis that intersects a stem of the intake valve.

2. The engine system of claim 1, where the flow altering surface includes a second side with a curved contour, where the first side and the second side of the flow altering surface have an overall spoon shape, the flow guide actuator rotating the spoon shape about an axis of the shaft.

3. The engine system of claim 2, where the first and second sides of the flow altering surface have opposing contours.

4. The engine system of claim 3, where rotational movement of the flow altering surface changes a relationship of the first and second sides with the intake airflow to generate desired tumble and swirl patterns.

5. The engine system of claim 2, where the first side has a concave contour and the second side has a convex contour.

6. The engine system of claim 1, further comprising a controller configured to command the flow guide actuator to rotate the flow altering surface into an inactive position and the plurality of active positions based on engine operating conditions.

7. The engine system of claim 6, where the engine operating conditions include one or more of engine power, load, air/fuel ratio, temperature, engine speed, and exhaust gas composition.

8. The engine system of claim 1, where the shaft is directly attached to the flow altering surface and the flow guide actuator.

9. The engine system of claim 1, where an angle formed between the rotational axis of the shaft and a line extending through a longitudinal tip of the flow altering surface and an intersection between the shaft and the flow altering surface is greater than 5 degrees.

10. The engine system of claim 1, where a section of the flow altering surface is radially offset from the rotational axis of the shaft.

11. The engine system of claim 1, where the shaft extends through a lower wall of the intake port in a cylinder head.

12. The engine system of claim 1, where a rotational axis of the flow altering surface intersects a stem of the intake valve at a non-straight angle.

13. An engine system comprising:
a rotatable flow guide extending away from a shaft into an intake port and including a flow altering surface positioned upstream of an intake valve, the rotatable flow guide having a first side with a concave contour and a second side with a convex contour, the flow altering surface generating tumble and swirl flow patterns in intake airflow entering a cylinder through the intake valve in a plurality of active positions; and
a flow guide actuator rotating the flow altering surface to alter the tumble and swirl flow patterns of the intake airflow;
where the shaft has a rotational axis that intersects a stem of the intake valve.

14. The engine system of claim 13, further comprising a controller configured to command the flow guide actuator to rotate the flow altering surface into an inactive position and the plurality of active positions based on engine operating conditions.

15. The engine system of claim 14, where tumble ratios and/or swirl ratios of the intake airflow when the flow altering surface is in the plurality of active positions are each greater than a tumble ratio and/or a swirl ratio of the intake airflow when the flow altering surface is in the inactive position.

16. The engine system of claim 13, where a rotational axis of the flow altering surface intersects a stem of the intake valve at a non-straight angle.

17. A method for operating an engine system comprising:
during a first operating condition, flowing intake air through an intake port past a flow altering surface of a rotatable flow guide arranged in an inactive position where the flow altering surface is directly adjacent to a wall of the intake port upstream of an intake valve of a cylinder, where the flow altering surface of the rotatable flow guide is attached to a shaft and extends away from the shaft into the intake port; and
during a second operating condition, rotating the flow altering surface into an active position where the flow altering surface generates a selected tumble and swirl flow pattern of intake air entering the cylinder through the intake valve;
where the shaft has a rotational axis that intersects an intake valve stem.

18. The method of claim 17, further comprising during a third operating condition, rotating the flow altering surface into a second active position where the flow altering surface generates a second selected tumble and swirl flow pattern of intake air entering the cylinder through the intake valve.

19. The method of claim 18, where during the third operating condition a swirl ratio of the intake airflow is increased and a tumble ratio of the intake airflow is decreased.

20. The method of claim 17, where the first operating condition is when engine speed is below a threshold value and the second operating condition is when engine speed is greater than the threshold value.

* * * * *